United States Patent [19]

Graef et al.

[11] Patent Number: 5,099,423

[45] Date of Patent: Mar. 24, 1992

[54] METHOD AND APPARATUS FOR ACCOUNT SETTLEMENT IN AN ATM

[75] Inventors: Harry T. Graef; Kevin H. Newton; Timothy B. Allison; Jeffrey M. Eastman, all of Stark County, Ohio

[73] Assignee: Diebold, Incorporated, Canton, Ohio

[21] Appl. No.: 370,216

[22] Filed: Jun. 22, 1989

Related U.S. Application Data

[60] Division of Ser. No. 931,010, Nov. 17, 1986, Pat. No. 4,871,085, which is a continuation of Ser. No. 749,960, Jun. 27, 1985, abandoned.

[51] Int. Cl.⁵ .............................................. G06F 15/30
[52] U.S. Cl. .................................... 364/406; 235/379
[58] Field of Search ............... 235/379, 448; 221/197; 271/145; 364/401, 406, 408

[56] References Cited

U.S. PATENT DOCUMENTS

| | | | |
|---|---|---|---|
| 2,919,790 | 1/1960 | Winz et al. | 198/352 |
| 3,611,403 | 10/1971 | Gilford et al. | 346/1.1 |
| 3,662,706 | 5/1972 | Soini | 209/528 X |
| 3,665,161 | 5/1972 | Oberhart | 235/448 |
| 3,671,720 | 6/1972 | White et al. | 235/448 X |
| 3,673,389 | 6/1972 | Kapsambelis et al. | 235/436 |
| 3,705,416 | 12/1972 | Head, III | 235/448 X |
| 4,056,063 | 11/1977 | Ritter | 104/88 |
| 4,221,376 | 9/1980 | Handen et al. | 271/149 |
| 4,337,393 | 6/1982 | Hilton | 235/487 |
| 4,337,864 | 7/1982 | McLean | 209/534 |
| 4,570,548 | 2/1986 | Martin et al. | 109/66 |
| 4,573,606 | 3/1986 | Lewis et al. | 221/2 |
| 4,657,380 | 4/1987 | Hamano et al. | 355/55 |
| 4,670,643 | 6/1987 | Hain et al. | 235/379 |
| 4,752,874 | 6/1988 | Meyers | 364/405 |
| 4,786,042 | 11/1988 | Stemmle | 271/9 |
| 4,808,801 | 2/1989 | Nakagawa | 235/379 |

FOREIGN PATENT DOCUMENTS

2039264 8/1980 United Kingdom .

Primary Examiner—Dale M. Shaw
Assistant Examiner—David Huntley
Attorney, Agent, or Firm—D. Peter Hochberg; Mark Kusner; Louis J. Weisz

[57] ABSTRACT

Apparatus for identifying and indicating the content of document canisters such as those used to hold supplies of documents in Automatic Teller Machines (ATMs), includes a canister (10) holding a stack of documents (30) and having a face plate (24). Face plate (24) includes a plurality of buttonholes (26). Spring loaded buttons (25) are distributed among buttonholes (26); the arrangement of the buttons representing items of data such as ownership of the canister, canister serial number, and document information such as the type, denomination, amount, and character of the documents in the canister. When inserted in the ATM, the canister exchanges identifying information with the ATM via the arrangement of buttons. A computer, which controls the operation of the ATM, uses this information to do such things as adjust the operation of the ATM to conform to the type, denomination, and character of the documents in each canister, settle accounts between entities who supply the documents to the ATM, track the location of each canister, determine serial numbers of canisters involved in dispense failures, and signal when the documents in a canister need to be replenished.

5 Claims, 10 Drawing Sheets

METHOD AND APPARATUS FOR ACCOUNT SETTLEMENT IN AN ATM

This application is a divisional application of application Ser. No. 931,010 filed Nov. 17, 1986, which prior application is a continuation of application Ser. No. 749,960, filed June 27, 1985. Application Ser. No. 749,060 is now abandoned. Application Ser. No. 931,010 is now U.S. Pat. No. 4,891,085.

TECHNICAL FIELD

This invention relates to document containers such as currency containers which are used in automated document dispensing machines and Automated Teller Machines (ATMs). Specifically this invention relates to improved apparatus and methods for labeling such document containers with information in a machine readable form which is used to keep track of such things as the location, ownership, and serial numbers of each container; the type and denomination of the documents in each container; and changes in the status of the documents in each container.

BACKGROUND ART

Automated document dispensing machines such as ATMs contain supplies of documents to be dispensed. Usually such machines dispense several types of documents. These documents may include different denominations of paper currency or travelers checks. It is the general practice to load a store of documents into an ATM in specialized containers called "canisters". Canisters are usually filled with documents at locations away from the ATM under secure conditions. Normally each canister will contain only one type of document. Canisters generally contain locking mechanisms which secure the canisters once they are filled with documents. Canisters are transported to the ATM in the locked condition. Special unlocking mechanisms inside the ATM unlock the canisters as they are loaded into the machine.

Canisters are designed to operate in conjunction with the particular document removal mechanism incorporated into the ATM. The canister is an integral part of the document dispensing system. An example of a canister adapted for use in an ATM is disclosed in U.S Pat. No. 4,113,140.

Canisters present the advantage of allowing large numbers of documents to be loaded into ATMs quickly and also permit interchangeability of canisters between machines which have the same type of document removal mechanism. All paper currency in the United States has the same physical dimensions and consistency regardless of denomination. Therefore, canisters which are used to dispense paper currency are interchangeable with regard to the denomination of the currency which may be dispensed therefrom.

While the interchangeability of document canisters between ATMs and the ability to place different types of paper currency in the same canister are desirable features, problems have developed. First, most ATMs are designed to dispense a plurality of denominations of bills and therefore must contain a plurality of canisters, one for each denomination of bills. Most ATMs are designed so that each bill type must be provided at a particular location inside the ATM to achieve a proper dispense. Failure to load the various bill canisters into the proper canister locations will result in malfunctions; for example, the ATM dispensing ten dollar bills when twenty dollar bills are requested.

Financial institutions and other operators of ATMs have sought to avoid these problems by physically labeling each canister with information on the document type contained therein and by labeling the corresponding positions for the canisters inside the ATM. Taking these precautions generally insures that the person loading the canisters will do so properly; however, errors still occur. Further, it is difficult to remove such permanent labeling from a canister when it is desired to use the canister to dispense a different type of document.

As canisters are an integral portion of the document delivery system, defects in a canister may cause dispense failures. Such failures sometimes occur infrequently at irregular intervals making the cause of the problem difficult to pinpoint. Some operators of ATMs have assigned serial numbers to their canisters to monitor whether certain of them are involved in an extraordinary number of dispense failures, which may indicate a defective condition. As serial numbers are generally printed on the canisters in a human readable form, tracking the identity of canisters involved in failures requires considerable bookkeeping and paperwork. Such manual record keeping is often subject to human error. In addition because dispense failures are generally readily corrected, all failures may not be reported. These problems make keeping track of the canisters involved in failures burdensome and available records are often inaccurate.

Additional problems may arise when several entities such as a group of banks elect to operate a network of many ATMs, which are located away from the banks such as in grocery stores, shopping malls, and airports. In such a network several of the financial institutions may wish to share responsibility for servicing the ATMs, including providing the canisters filled with documents and currency. In these situations there is need to know the origin of the currency or documents dispensed from each ATM to settle accounts between the participants. For example, if a customer of a first bank receives money at an ATM located in a shopping mall and the currency in that ATM belonged to a second bank, it is necessary to keep track of the parties involved in the transaction so that the first bank can repay the second bank for the money received by its customer. Tracking accounts is less complex if the second bank always provides the currency dispensed from a particular ATM and the identity of the ATM where each transaction occurs is maintained in the records of the network. The situation becomes increasingly complicated however when several entities share responsibility for loading currency into the same ATM; for example, each providing the currency on alternative weeks. This greatly complicates the record keeping necessary to settle accounts between the various parties involved. Such record keeping is prone to inaccuracy because it is difficult to keep track of the origin of the currency or documents involved in particular transactions. As more entities share responsibility for loading documents into ATMS, the problems of record keeping grow proportionately.

Others have previously attempted to overcome some of the foregoing problems by labeling document canisters in a manner which can be received by the computer system which controls the operation of an ATM. Such information may be stored or utilized in combination with other data to accomplish such things as, for example, to prevent operation of the ATM when the canisters have been misloaded and to track the particular serial numbers assigned to such canisters. Unfortunately, all of the systems known in the prior art are of limited usefulness or have other undesirable characteristics. De La Rue Systems Ltd. of London, England has developed a system which identifies the denomination of the currency contained in a document canister loaded into an ATM. De La Rue's system involves the placement of a magnetic element on an external portion of each canister. The location of the magnetic element is dependent on the denomination of the contained currency. If the canister is loaded into the ATM correctly, the magnetic element will be located adjacent to a magnetic sensing switch mounted inside the ATM near the canister. When the magnetic element is adjacent to the switch, a signal is generated. It is only when all the signals from the canisters are present that the ATM will operate. While this system prevents operation of the ATM when canisters are misloaded, it has the limitation that the ATM cannot be operated until the problem is identified and corrected. In addition, the location of the magnetic elements on De La Rue's canisters are difficult to change, making it difficult to change a canister from one denomination of currency to another. Due to variance in the strength of magnetic elements, a canister with a weak magnet may not actuate the magnetic sensing switch in the ATM. Also the magnetic elements tend to lose magnetic strength with the passage of time and vibration which frequently occurs during transport, accelerates demagnetization. The De La Rue system provides no means of indicating ownership, serial numbers of the canisters or for indicating the status of the documents.

The Inter Innovation Company of the Netherlands has also developed a method of labeling canisters used in its ATMs. This system involves placement of information concerning the denomination of the bills contained in a canister as well as the serial number assigned to the canister, on a read-only memory (ROM) computer chip installed in the canister. When the canister is placed in the ATM, an electrical lead inside the ATM is connected to the canister. The information on the ROM is then read by the computer which controls the operation of the ATM. This method provides the advantage that canisters can be installed in any canister location in the ATM and the computer system will conform the operation of the document dispensing mechanisms to the denomination of the bills located in the corresponding canisters. Inter Innovation's method also provides a means of tracking the location of each canister by its serial number which can be combined with information on the ownership of the various canisters stored in the memory of the computer to settle accounts. In addition, information on the canisters involved in failures can be stored in the memory of the computer which operates the ATM and can be analyzed to determine if any canister is demonstrating an extraordinary number of failures suggestive of a defective condition. The Inter Innovation system has several limitations, however. Canisters loaded with currency are heavy and are frequently transported significant distances prior to being installed in an ATM. Transport exposes the canister to vibration and extremes of temperature which can damage the ROM. In addition, because canisters are loaded and unloaded frequently, the electrical connectors between the ATM and the canister wear out rapidly resulting in failures. The Inter Innovation system is expensive to implement due to the need to include additional electrical equipment in the canister and the ATM as well as to program each ROM. The ROM is sensitive to static electricity and may lose all or a portion of its memory due to exposure to small static charges created by clothing or carpeting. Also if the information is going to be utilized to settle accounts among institutions, the computer operating the ATM must be programmed and a portion of its available memory dedicated to storing ownership information concerning each canister. Lastly, the information on the ROM is difficult to change in the event it should become necessary to dispense a different type of currency from a canister or to change the serial number.

There is frequently a need for ATMs to dispense documents other than currency. Usually these documents are dispensed using the same dispense mechanisms which were originally designed to handle only paper currency. Such documents may include, for example, travelers checks, coupons, and gift certificates. Such documents will generally have physical characteristics that differ somewhat from paper currency. Often however these documents may be effectively dispensed provided that the operation of the dispense mechanism is slightly modified. In many cases such modifications can be automatically implemented provided that the computer which controls the operation of the dispensing mechanism has available a sub-routine which will operate to control the ATM's dispense mechanism in accordance with the characteristics of the documents. The parameters which may need to be modified may include, for example, the speed at which the dispense mechanism operates or the cycle times of certain components of the dispense mechanism. If a means is available to distinguish these other documents from currency in the canister, these changes in the operation cycle of the dispensing mechanism can be implemented by the computer automatically. In addition, paper currency itself may have different characteristics depending on whether it is new or used. It is therefore desirable to vary the operating parameters of the dispensing mechanism to better suit the character of the currency in a canister. To applicant's knowledge no prior system has been developed that is capable of presenting such information on a document canister in a form that can be received and utilized by the computer which operates an ATM.

As a result of the limitations which exist in prior systems, there exists a need for an inexpensive and reliable apparatus and method for providing, identifying, and indicating information concerning the contents of a document canister, which information can be read, transmitted, and utilized by a computer controlling the operation of an ATM or other document dispensing mechanism and which information is secure from tampering but may be readily changed by authorized personnel.

DISCLOSURE OF INVENTION

It is an object of the present invention to provide apparatus and a method for labeling a document canister with information indicating ownership of the canister and the serial number assigned to the canister in a machine usable form.

It is a further object of the invention to provide apparatus and a method for labeling information indicative of the type, denomination, and character of documents contained in a canister in a machine usable form.

It is a further object of the invention to provide apparatus and a method for labeling information on a document canister in machine usable form, which information is tamper resistant but which may be readily changed by authorized personnel to reflect changes in the contents or ownership of the canister.

It is a further object of the invention to provide apparatus and a method for labeling information on a document canister in a machine usable form, a portion of which information operates as a check to verify that all the other information labeled on the canister is accurately received.

It is a further object of the invention to provide apparatus and a method for labeling information on document canisters in a machine usable form that is less expensive to implement than apparatus and methods presently available.

It is a further object of the invention to provide apparatus and a method for labeling information on a document canister in a machine usable form which indicates the changing status of the documents located inside the canister, such as to provide an indication of when the documents need to be replenished.

Further objects of the invention will become apparent in the attached description of the best modes for carrying out the invention and the appended claims.

The invention of the present application achieves the foregoing objects by providing apparatus and a method for labeling information on a document canister for an ATM, which information is provided in a form which is read by apparatus located inside the ATM. The information is communicated to the computer controlling the operation of the ATM which then operates to change the operation of the dispensing mechanisms of the ATM lo conform such operation to the type of documents contained in the canister. Canister identifying information is analyzed with information concerning dispense failures in the data storage area of the computer to identify canisters involved in dispense failures and to point out possible defective conditions which may exist in such canisters. Further, the information provided according to the present invention is used to track the ownership of the canister and the documents contained in the canister, which information is used to simplify the settlement of accounts between a plurality of parties who load their document canisters into an ATM.

According to the preferred embodiment of the invention, a canister which contains documents to be dispensed by an ATM has a series of uniformly sized holes in a first portion of the canister; the first portion being the face of the canister which is first inserted into the ATM when the canister is loaded. Buttons formed of resilient material are installed in these holes from the inside of the canister. The buttons incorporate a lip at one end; the lip being a larger diameter than the holes in the canister. The lip prevents the buttons once installed, from falling or being pulled to the outside of the canister through the buttonholes. Behind the buttons on the inside of the canister is a spring-loaded backing plate. The backing plate causes the buttons to act as protuberances that extend out of the canister to the full extent possible under normal conditions. The backing plate is detachable and may be readily removed by authorized persons who have access to the inside of the canister so that the arrangement of the buttons in the holes may be changed.

Inside the ATM where the face of the canister having the buttons is positioned when the canister is in its operating position, there is located a series of electrical switch actuators. The location of these switch actuators corresponds to each of the buttonholes in the canister. When the canister is in its installed position, the buttons protruding from the canister contact the corresponding switch actuators causing electrical switches associated with the switch actuators to generate electrical signals.

The canister also incorporates a guide hole in its front wall. The guide hole is positioned to mate with a guide pin located inside the ATM When the canister is in its operating position, the mating of the guide hole and guide pin insures that each button is properly oriented to contact its corresponding switch actuator.

The electrical switches associated with the switch actuators generate electrical signals which are indicative of the arrangement of the buttons in the holes on the canister. These electrical signals are transmitted to the computer which controls the operation of the ATM. The computer compares the received signals to information stored in its memory to determine the information represented by the arrangement and processes or stores such information according to its programming.

According to the preferred embodiment of the present invention, the buttonholes in the canister may be divided into subsets. Each subset is assigned to represent a particular item of information such as the owner of the canister, the canister serial number, the document type contained in the canister, the document denomination contained in the canister, or the condition of the contained documents. In addition, a further subset is reserved for an accuracy check to insure that all the information represented by the button arrangements in the other subsets is accurately received by the computer operating the ATM. Arrangements of buttons in the holes of the subsets is designated to represent particular information. Each arrangement and the information represented thereby, are programmed and stored in the memory of the computer which controls the operation of the ATM.

A button which is not part of another subset is attached to a mechanism inside the canister, which mechanism monitors the status of the document supply. The backing plate is cut away behind this button to provide access for the mechanism. The mechanism operates to move the associated button in and out of the canister and causes it to contact the associated switch actuator in the ATM in response to changes in the supply of documents. According to the preferred embodiment of the invention, the mechanism causes the button to change position when the document supply inside the canister decreases a predetermined amount. The movement of the button and the associated signal produced by the electrical switch associated with the button is received by the computer which generates an output indicating that the documents in the canister need to be replenished.

BEST MODES FOR CARRYING OF INVENTION

The preferred embodiment of the present invention is used in conjunction with the friction picker mechanism for removing documents from a document canister in an ATM described in U.S. Pat. No. 4,494,747 and assigned to the assignee of the present invention, which patent is incorporated herein by reference in its entirety. Portions of the friction picker mechanism are shown in the drawings. Features of the friction picker mechanism not essential for understanding the present invention have been deleted for clarity and brevity.

Figure 1:
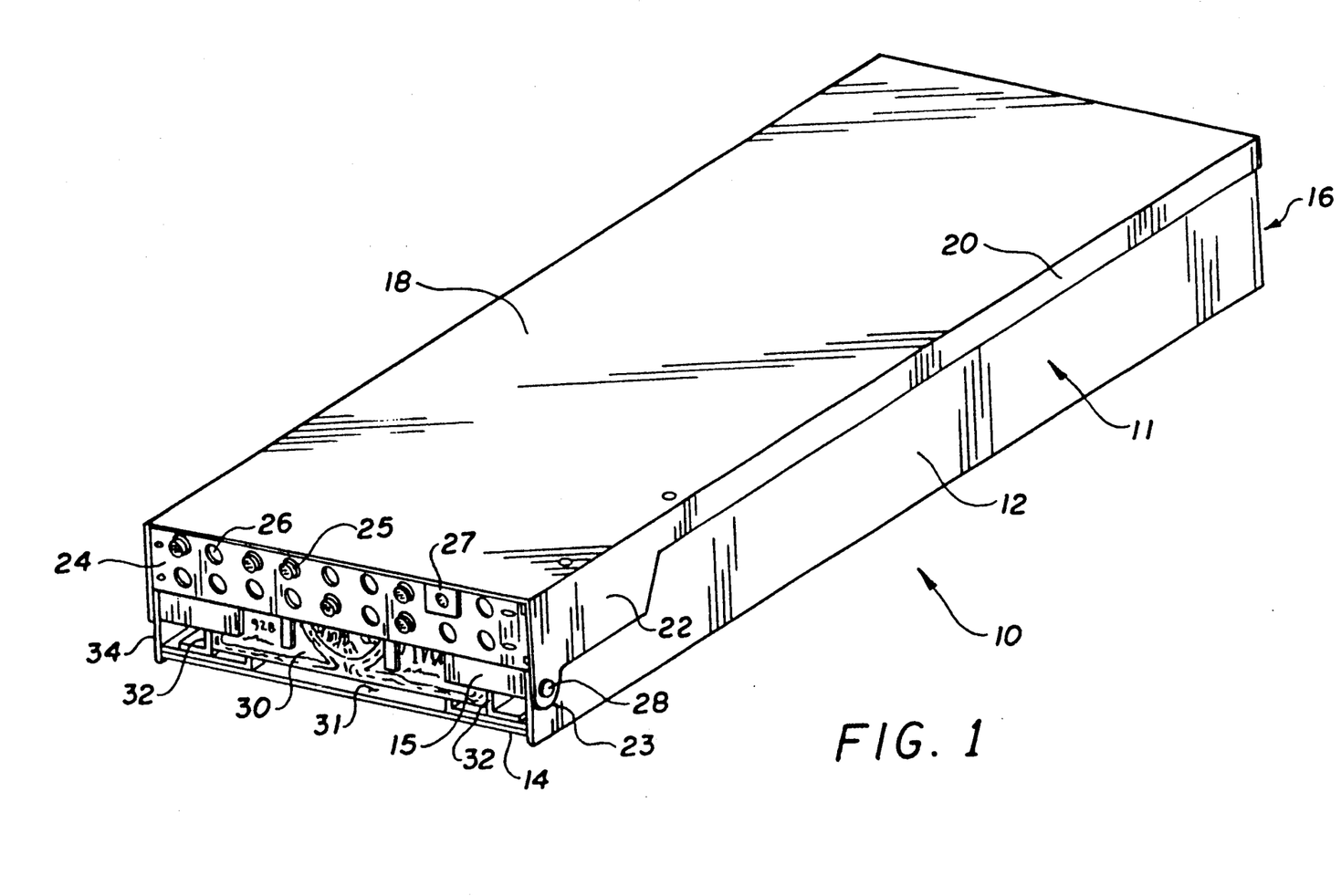
FIG. 1 is a perspective view of a canister containing currency and incorporating the preferred embodiment of the present invention.
Figure 2:
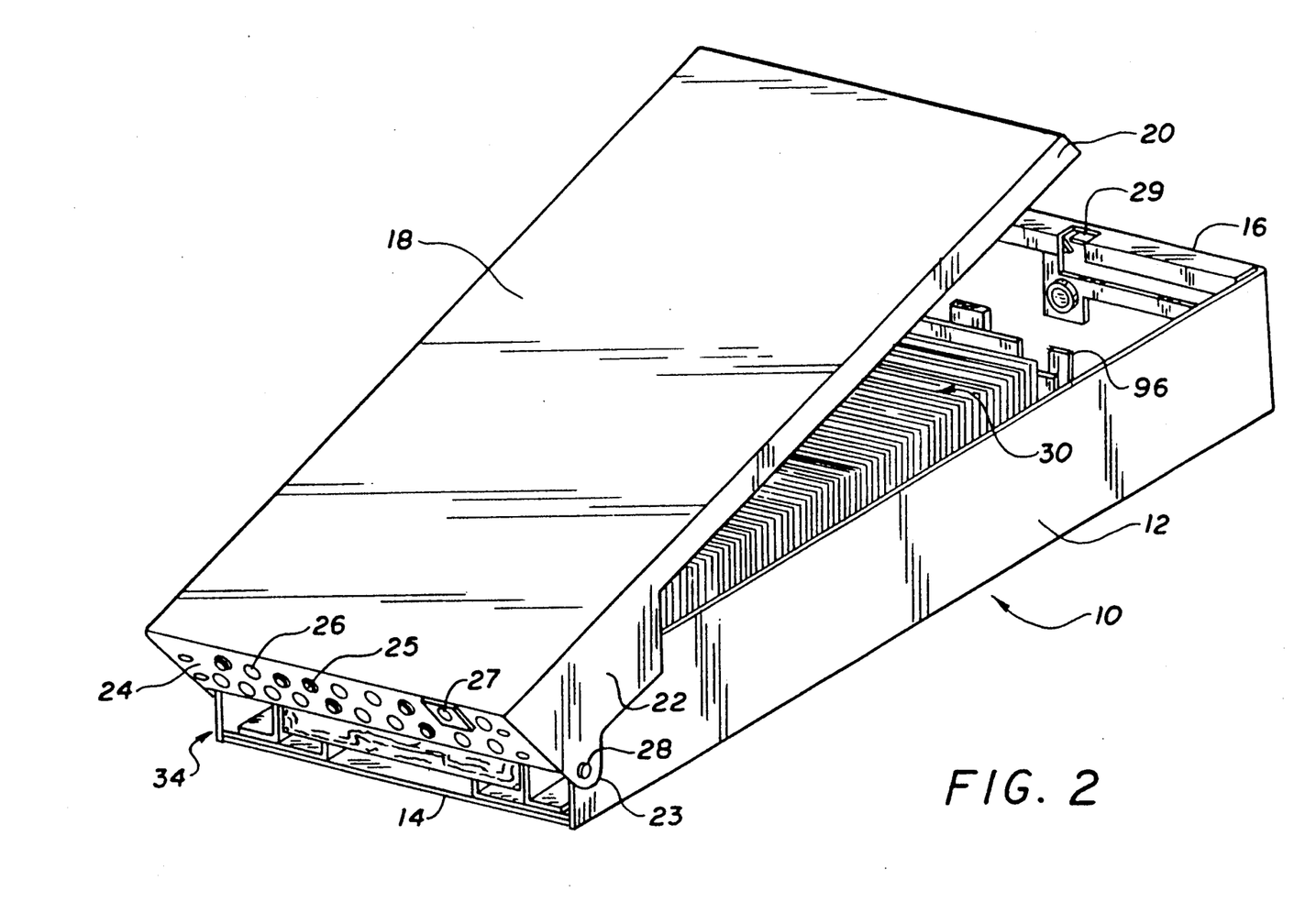
FIG. 2 is a perspective view of the document canister with its top raised.

Referring now to the drawings and specifically to FIG. 1, there is shown a document canister generally designated 10. The canister is composed of a lower portion 11 consisting of sidewalls 12, bottom wall 14, partial front wall 15, and back wall 16. Canister 10 also has a top 18 which includes flanges 20, which extend over side walls 12 and back wall 16 when the top is in its closed position. Flanges 20 terminate in thickened portions 22 near the front of the canister. Top 18 also incorporates a face plate 24 which has a plurality of buttonholes 26 and a guide pin hole 27. Thickened portions 22 of flanges 20 terminate in ears 23. Ears 23 cooperate with hinge means 28 attached to lower portion 11 which allows top 18 to be opened as shown in FIG. 2. Top 18 and lower portion 11 are preferably made of molded plastic construction. Canister 10 also incorporates locking means generally indicated 29 which may be used to selectively fasten top 18 to lower portion 11. A plurality of buttons 25 are located in and extend through certain of buttonholes 26, the arrangement of said buttons being significant to the present invention as later explained.

Figure 6:
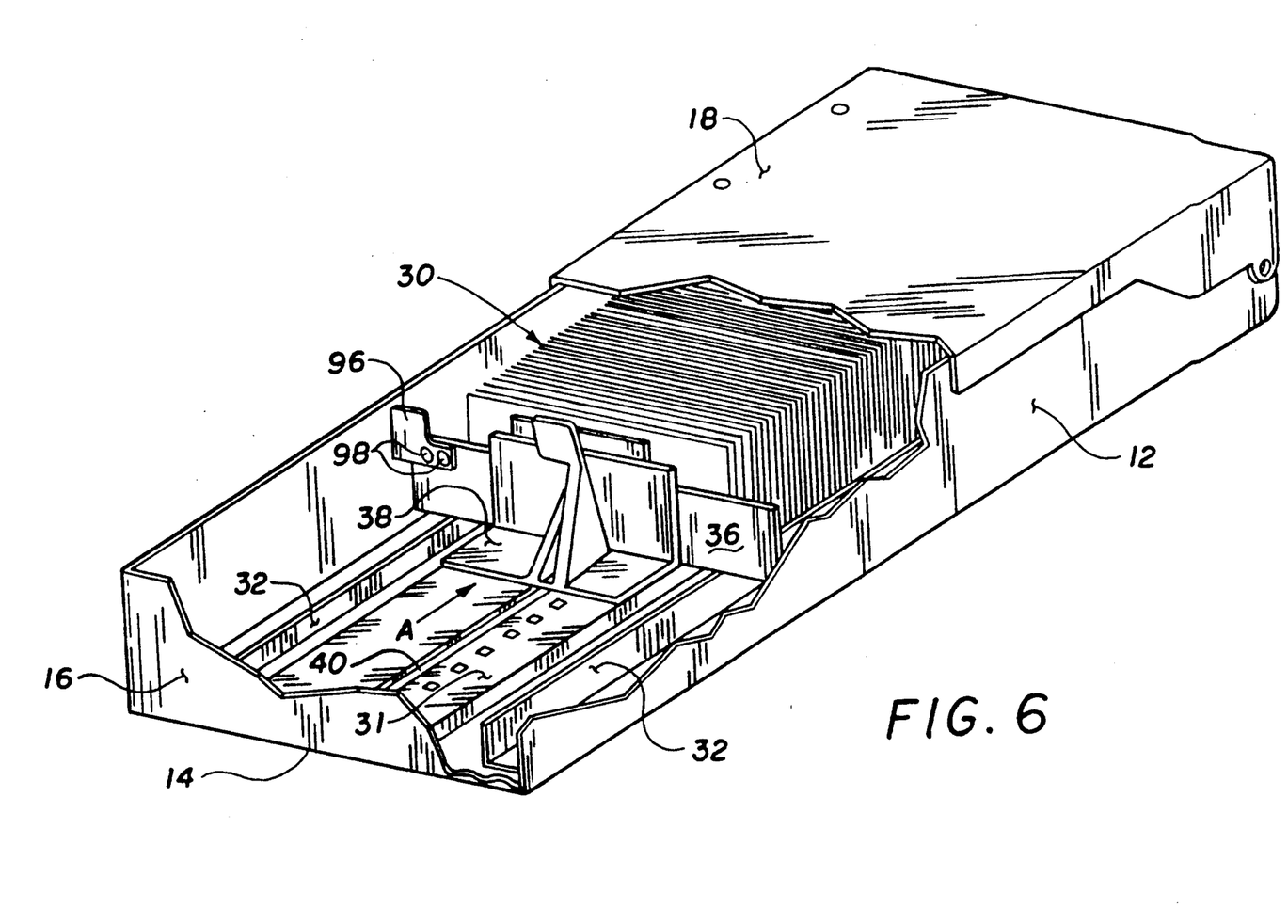
FIG. 6 is a partially sectioned perspective view of the posterior portion of the canister.

Canister 10 contains a stack of paper currency 30. The stack is supported off the bottom of the canister on a shelf portion 31 and held between guide rails 32 which extend upward from canister bottom 14. A pusher plate 36 (see FIG. 6) contacts the rear of stack 30. Pusher plate 36 includes a foot portion 38. A slot 40 is cut into and extends longitudinally along the center of shelf portion 31. Guide means (not shown) attached to foot 38 limit the movement of pusher plate 36 to along slot 40. Force application means (not shown) applied to pusher plate 36 tend to move pusher plate 36 and stack 30 in the direction of arrow A. This force causes the bill located at the front of stack 30 to be present at the opening in partial front wall 15 of the canister generally designated 34. Opening 34 is open during removal of documents from canister 10; however, closure means are normally provided to secure opening 34 when the canister is outside an ATM. The interior portion of partial front wall 15 contacts the upper portion of the first bill in stack 30 and counteracts the force applied to the stack by pusher plate 36, thus retaining the stack inside the canister.

Figure 4:
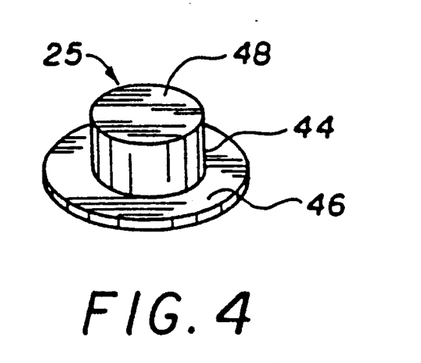
FIG. 4 is a perspective view of a button which may be installed in the buttonholes in the canister.
Figure 7:
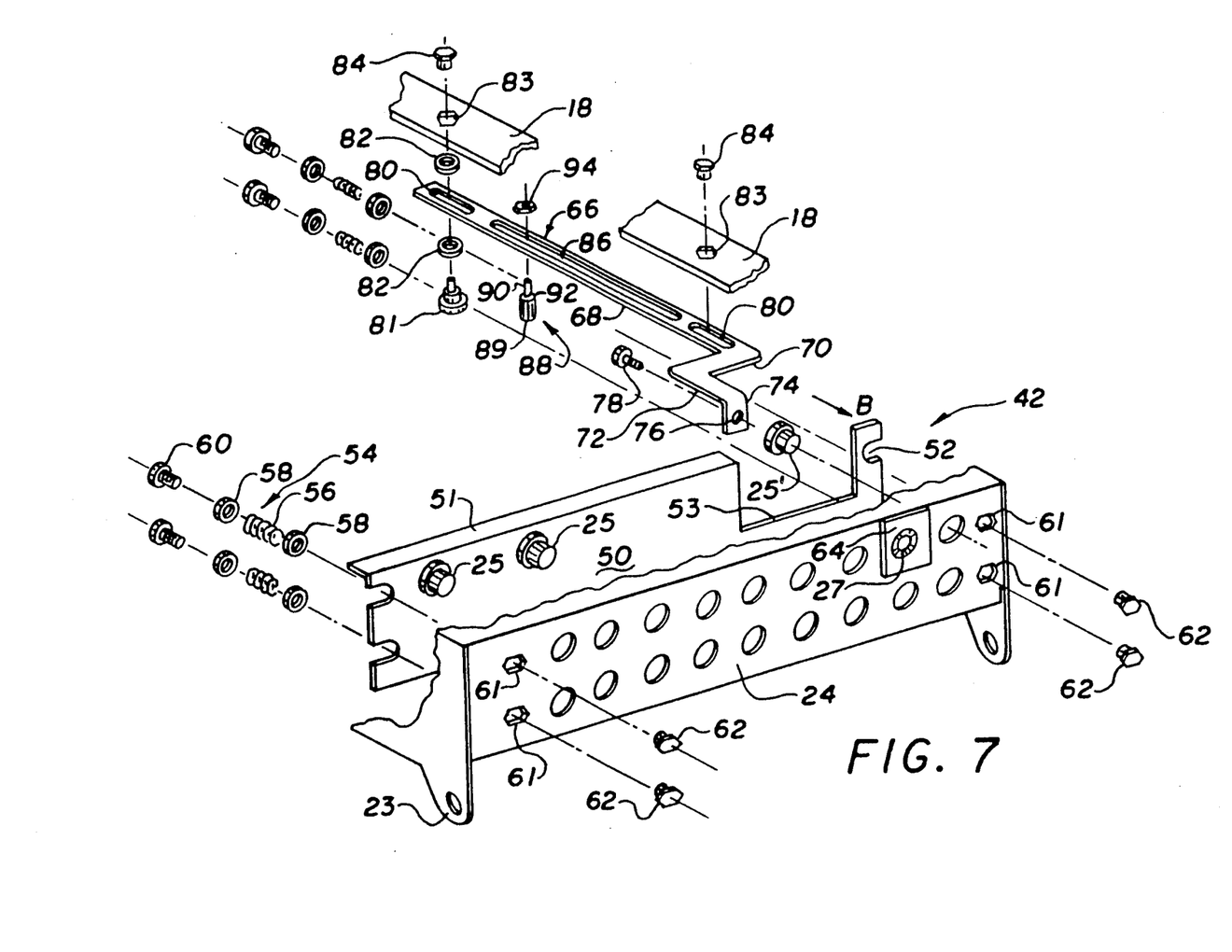
FIG. 7 is an exploded view of the front of the canister and the button retaining assembly.

A button retaining assembly generally designated 42 is shown located behind face plate 24 inside the canister 10 in FIG. 7. Buttonholes 26 are sized to accept buttons 25. Buttons 25 include a cylindrical portion 44 (see FIG. 4) of uniform diameter and a lip portion 46 of a larger diameter. Buttons 25 terminate in a flat portion 48. The relationship of the diameters of buttonholes 26 and the cylindrical portion 44 of a button 25 is such that a button may slide back and forth in buttonholes 26 but is prevented from fully passing through a buttonhole by the larger diameter of lip 46.

A backing plate 50 is mounted to the rear of buttons 25 inside canister 10. Backing plate 50 has four (4) notches 52. Backing plate 50 also incorporates a flange 51 and a cut-away portion 53, the purpose of which will be explained later. The backing plate is normally held against the posterior of buttons 25 by spring loaded fastener assemblies generally designated 54. Spring loaded fastener assemblies 54 are each comprised of a spring 56 and flat washers 58 to the front and rear of spring 56. Bolts 60 extend through flat washers 58 and springs 56 as well as through notches 52 of backing plate 50. Hex-shaped holes 61 in face plate 24 accept threaded inserts 62. Bolts 60 are threaded into inserts 62 and thereby attach to face plate 24. The presence of bolts 60 extending through notches 52 prevents lateral movement of backing plate 50. The force applied by springs 56 to backing plate 50 tends to push buttons 25 through face plate 24 to the maximum possible extent, thus giving the buttons a spring loaded effect (see FIG. 8).

A bushing 64 surrounds guide pin hole 27 and is mounted on face plate 24 by attaching means. Bushing 64 is preferably made of a wear resistant material which allows guide pin hole 27 to retain its dimensional integrity despite repeated acceptance of guide pins which align and locate canister 10 with a document removal mechanism as will be later explained.

A link 66, preferably of stamped metal construction extends longitudinally parallel to canister top 18. Link 66 incorporates a first straight portion 68, a second portion 70 perpendicular to straight portion 68, and a third portion 72 parallel to portion 68. Link 66 terminates in a tab portion 74, the face of which is parallel to face plate 24. Tab portion 74 corresponds to the cut-away portion 53 of backing plate 50. A hole 76 is centrally located in tab portion 74. A button 25' is fixably mounted to tab 74 through screw means 78 which extend through hole 76. Link 66 also incorporates guide slots 80. Shoulder bolts 81 extend through flat washers 82 which are located above and underneath slots 80. Hex-shaped holes 83 in top 18 accept threaded inserts 84. Shoulder bolts 81 are threaded into inserts 84 and are thereby fixably attached to top 18. Slots 80 allow link 66 to move freely back and forth along the line of arrow B in FIG. 7.

Link 66 also incorporates a slot 86 located between slots 80. A pin 88 is comprised of a cylindrical portion 89, a threaded portion 90, and a shoulder portion 92. The threaded portion 90 of pin 88 extends through slot 86 of link 66. A nut 94 located on the side of link 66 opposite pin 88 accepts threaded portion 90 and locks pin 88 in position relative to slot 86.

A flag 96 (see FIG. 6) is attached to the posterior of pusher plate 36 by fastening means 98. Flag 96 is preferably made of flexible material such as plastic and extends above and outward from pusher plate 36. With top 18 in closed position, Flag 96 is of sufficient height that it will contact cylindrical portion 89 of pin 88 which serves as target means. As currency is depleted from stack 30 and pusher plate 36 moves in the direction of arrow A, flag 96 contacts pin 88. As currency is further depleted and pusher plate 36 moves further forward in the canister, flag 96 is deflected applying a force to pin 88. This force tends to move pin 88 and link 66 to which it is connected in the direction of arrow B in FIG. 7. This applied force causes button 25' attached to link 66 which serves as movement means to be pushed outward through face plate 24 to the maximum extent possible. Eventually flag 96 moves past pin 88 and the force is no longer exerted on button 25'. As pin 88 can be positioned in any location along slot 86, the movement of button 25' is used as an indication of the position of pusher plate 36 and thus can be used to indicate when currency stack 30 should be replenished. As will be later explained, if provisions are made in the programming of the computer controlling the operation of the ATM for counting the number of times a force is exerted by button 25', additional pins 88 may be installed along slot 86. Each time that flag 96 contacts a pin 88 a force is exerted by button 25' and by counting the number of times such force is exerted, the computer monitors the movement of pusher plate 36 and thus obtains an indication of the number of bills remaining in stack 30.

Figure 3:
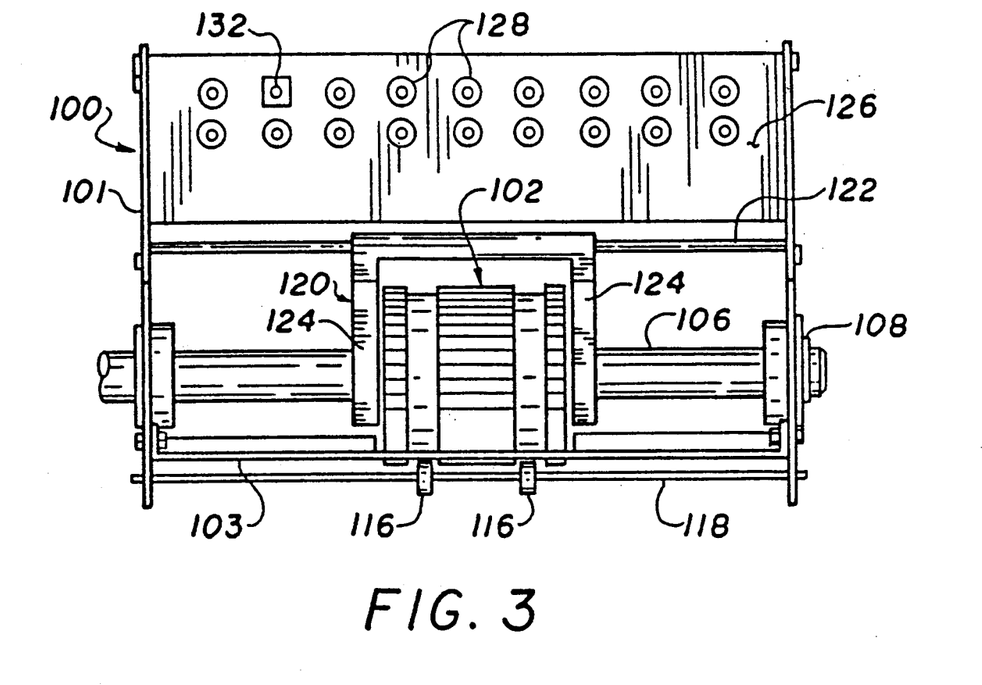
FIG. 3 is a plan view of the mechanism which removes documents from the canister inside an ATM and the switch actuators which correspond to the buttonhole locations on the canister.
Figure 9:
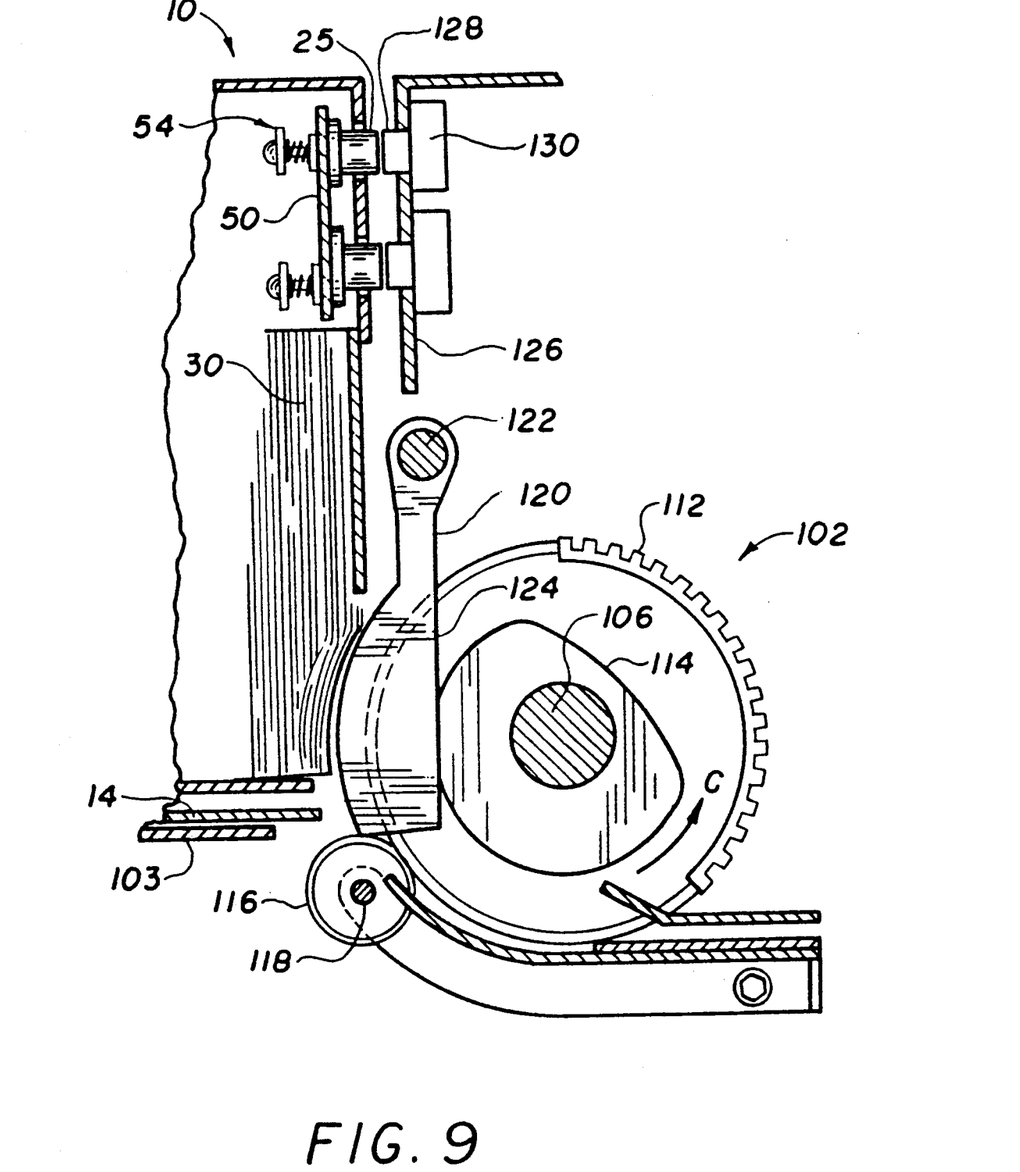
FIG. 9 is a section view of the canister and the document removal mechanism in operating position.
Figure 10:
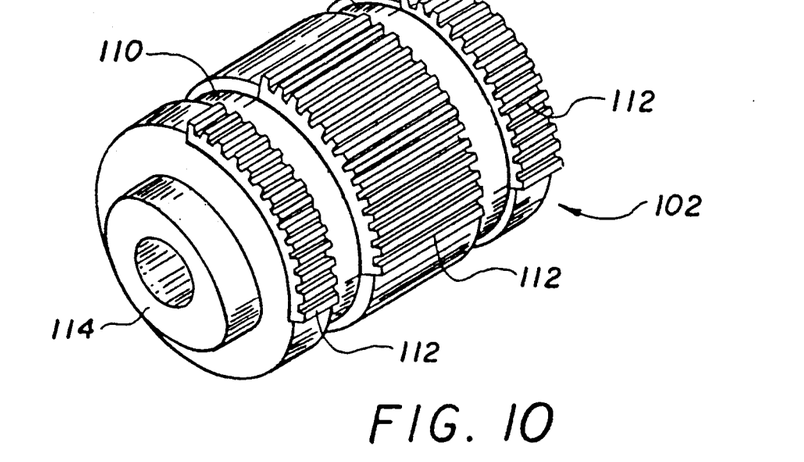
FIG. 10 is a perspective view of the roller of the document removal mechanism.

FIG. 3 shows a currency friction picker mechanism 100 which removes currency from canister 10. The operation of picker mechanism 100 is described in detail in U.S. Pat. No. 4,494,747 which is incorporated herein by reference. Each canister 10 in the ATM operates in conjunction with a corresponding picker mechanism 100. The picker mechanism is housed in a frame 101. Frame 101 includes a canister mounting plate 103. A roller member 102 is mounted on a shaft 106. Shaft 106 extends between bearing means 108 which extend through frame 101. Roller member 102 incorporates two (2) grooved portions 110 (see FIG. 10). The circumference of roller 102 is smooth except for high friction rubber portions 112. Roller 102 also incorporates cam means 114. Picker mechanism 100 also has a pair of stripper rolls 116 which are mounted on a shaft 118. Shaft 118 is positioned such that the outer circumferences of stripper rolls 116 lie within grooves 110 of roller 102 (see FIG. 9). Shaft 118 is mounted on bearing means (not shown) which extend through frame 101. During operation, shafts 118 and 106 are driven by drive means (not shown) such that both rotate in the counter-clockwise direction as shown in FIG. 9. A U-shaped lever 120 rides on a shaft 122 which is mounted to frame 101 by mounting means (not shown). U-shaped lever 120 has two legs 124, the inside of which maintain contact with cam means 114 during the operating cycle of the picker mechanism.

Figure 5:
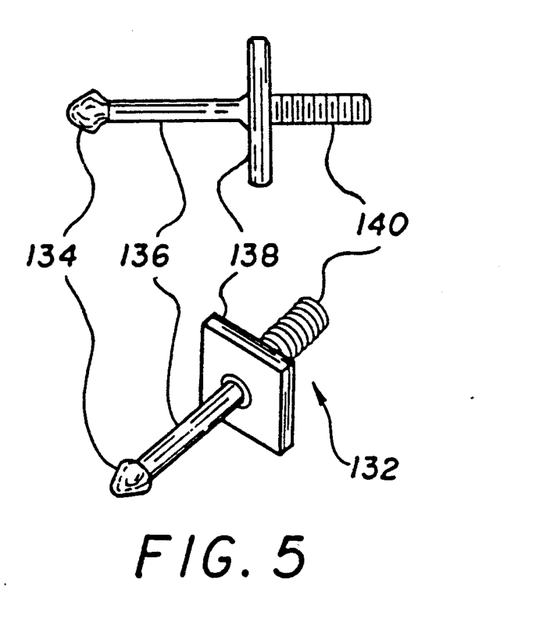
FIG. 5 are side and perspective views of a guide pin which is used to align the switch actuators in the ATM with the buttonholes in the canister.

Frame 101 of picker mechanism 100 includes a switch plate 126. Switch plate 126 incorporates a series of holes (not separately shown) through which extend actuators 128 of electrical switches 130. A guide pin 132 is fixably mounted to, and extends outward from switch plate 126 (see FIG. 8). Guide pin 132 includes a head portion 134, a shaft portion 136, a flange portion 138, and a threaded portion 140 (see FIG. 5). Threaded portion 140 accepts fastening means which fixably attaches guide pin 132 to switch plate 126.

When picker mechanism 100 receives canister 10 so that documents can be removed therefrom, bottom 14 of canister 10 is placed on canister mounting plate 103 of frame 101 of the mechanism. In moving canister 10 into operating position, opening 34 in partial front plate 15 of the canister moves towards roller 102 of the picker mechanism until the currency stack 30 contacts lever 120 (see FIG. 9). When the canister is fully inserted, head 134 and shaft 136 of guide pin 132 are accepted into guide pin hole 27 of canister 10. This fit insures that canister 10 is properly aligned with respect to picker mechanism 100. When documents are to be dispensed, roller 102 of picker mechanism 100 rotates in the direction of arrow C. U-shaped lever 120 is controlled by cam 114 and holds stack 30 away from roller 102 except at those times during rotation when the high friction portion 112 is in position to contact stack 30. This rotational movement of roller 102 causes the first bill to be removed from stack 30 by the grabbing action exerted by high friction portion 112. As a consequence, the first bill in stack 30 is pulled downwards into stripper rolls 116 which are rotating in the same rotational direction as roller 102. The action of stripper rolls 116 insure that only one (1) bill at a time is removed from stack 30 and that any additional bills are pushed or stripped backwards into the stack. Further rotation of roller 102 causes the first bill to be pulled past stripper rolls 116 due to the frictional characteristics and large surface area of high friction portion 112. Once the first bill has been pulled off stack 30 and past stripper rolls 116, it is moved by transport means (not shown) to a location for delivery outside the ATM.

Figure 8:
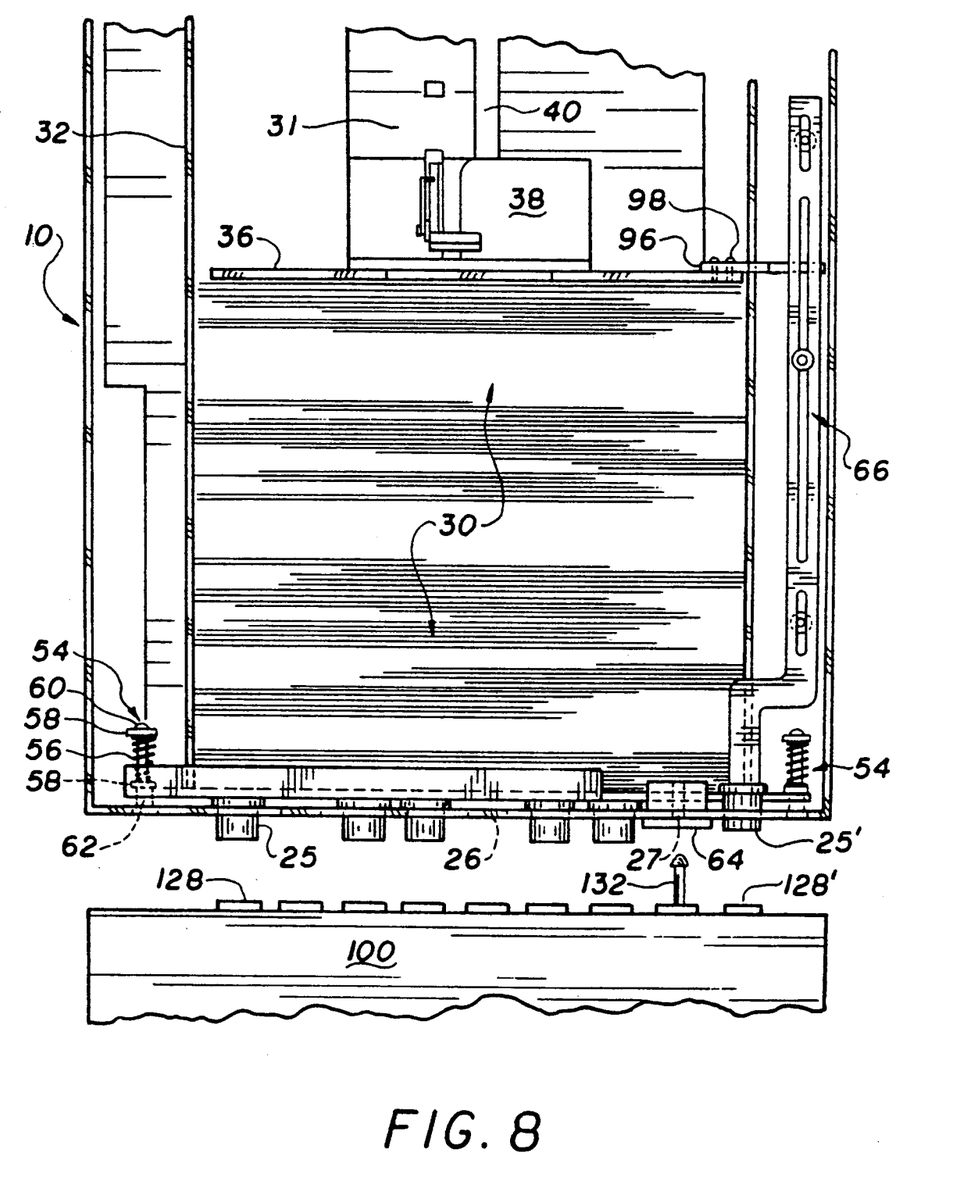
FIG. 8 is a partially sectioned top view of the canister and the switch actuators on the ATM which correspond to the buttonhole locations.

Buttonholes 26 in canister 10 are positioned such that when the canister and picker mechanism 100 are in operating position the buttonholes are in alignment with actuators 128 of switches 130, which actuators extend through switch plate 126 (see FIGS. 8 and 9). The cylindrical portions 44 of buttons 25 are of sufficient length that flat portions 48 contact actuators 128 and push buttons 25 inward. The action of spring assemblies 54 and backing plate 50 resists the inward movement of buttons 25 as canister 10 is moved into operating position. This reaction force causes actuators 128 which serve as sensing means, to be depressed. The spring loaded action of buttons 25 insures that actuators 128 contact all of the buttons in the arrangement even if face plate 24 and switch plate 126 are not perfectly parallel. Electrical switches 130 serve as signal generating means which exhibit a first electrical condition when their corresponding actuators 128 are not in contact with buttons 25 and a second electrical condition when actuators 128 are in contact with buttons 25. Electrical switches 130 are connected to the computer which controls the operation of the ATM.

Though actuators 128 correspond to the location of each buttonhole 26, buttons 25 are located only in certain selected holes. According to the preferred embodiment of the present invention, the arrangement of buttons is representative of information. Through the action of switches 130 which change their electrical condition in response to the presence of buttons, the button arrangement on the canister is transferred into a corresponding arrangement of electrical signals. Each button 25 is an information indicating means which may have one of two conditions; a first condition when a button is present and a second condition when a button is absent.

Button 25' like buttons 25 extends through a buttonhole 26 in canister 10. Button 25' corresponds to a particular switch actuator 128' on switchplate 126. Button 25' however differs from the other buttons in that it is not spring-loaded due to cut-away portion 53 in backing plate 50. Button 25' does not normally contact its corresponding actuator when canister 10 is loaded. As currency stack 30 is depleted due to removal of currency, pusher plate 36, which is a tracking means tracking the end of the stack 30, moves forward in canister 10. Eventually flag 96 which is a position indicating means contacts pin 88 which serves as a flag sensing means. Further movement of pusher plate 36 causes flag 96 to exert a force on pin 88. This force is transmitted by pin 88 to link 66 which slides forward. As link 66 slides forward button 25' contacts its switch actuator 128' (see FIG. 8). Further exertion of force by flag 96 on pin 88 causes button 25' to push on actuator 128' which changes the electrical condition of its corresponding switch 130'. (not separately shown) This change in electrical condition is sensed by the computer that controls the operation of the ATM. Further forward movement of pusher plate 36 causes flag 96 to "wipe" past pin 88 and thus a force is no longer exerted. The release of this force results in button 25' no longer pushing on actuator 128' and the electrical condition of switch 130' reverts to its original condition. Thus button 25' is an information indicating means which indicates the position of pusher plate 36 and thereby the number of documents remaining in stack 30.

Additional pins 88 may be mounted on link 66 at spaced intervals. As flag 96 wipes past each of these pins, button 25' exerts a force on its corresponding switch actuator 128' which changes the electrical condition of its corresponding switch 130'. The computer controlling the operation of the ATM is programmed to count the number of times switch 130' changes its position and thereby calculates the rate of depletion of stack 30.

The arrangement of buttons 25 in buttonholes 26 on canister 10 is representative of information. The arrangement is reproduced through the depression of switch actuators 128 and is electrically represented in the electrical signals generated by switches 130. The computer controlling the operation of the ATM to which switches 130 are connected is programmed to recognize each possible arrangement and to correlate the arrangements with the information each represents. The computer then stores and processes this information according to its programming to do such things as monitor canisters involved in dispense failures, settle accounts between parties who operate a network that the ATM may be part of, control the picker mechanisms to insure the correct amount of currency is dispensed, and adjust the operation of the picker mechanisms to conform to the documents in the canisters.

Figure 11:
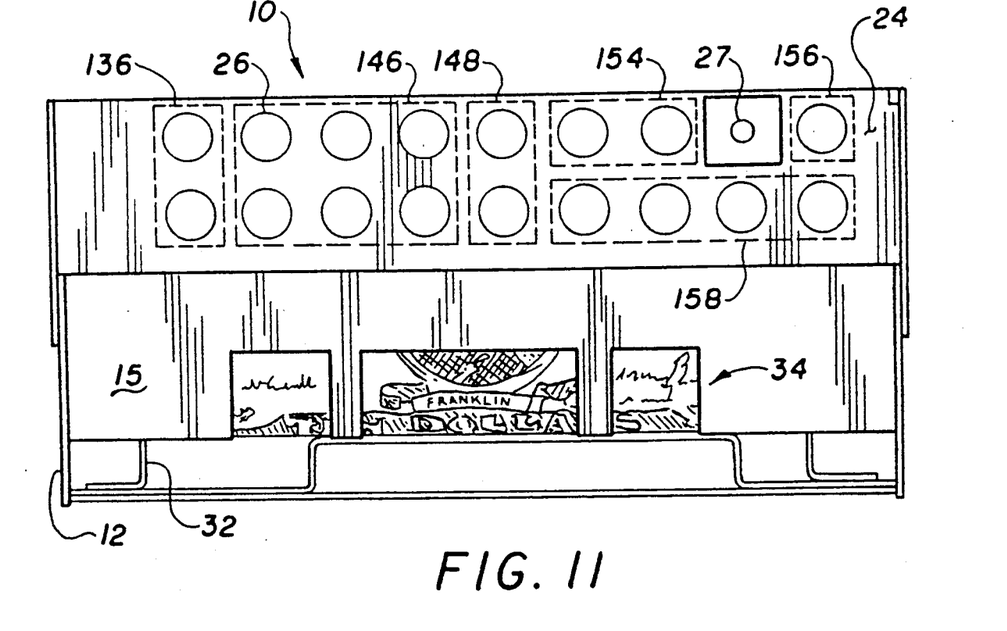
FIG. 11 is a front view of the canister showing the buttonholes divided into subsets.
Figure 12:
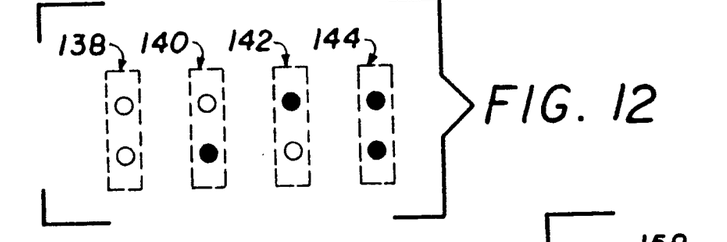
FIGS. 12 through 16 show arrangements of buttons in the subsets of buttonholes.

According to the preferred embodiment of the invention, buttonholes 26 are divided into groups or subsets. Each subset is designated as representing a particular type of information. FIG. 11 shows canister 10 with the buttonholes 26 in face plate 24 holding no buttons. Buttonholes 26 are divided into six (6) subsets shown separated by dotted lines. A first subset 136 is designated to represent ownership of the canister and the contained currency. As subset 136 has a pair of holes in which buttons can be placed, there are a maximum of four (4) different ways in which buttons can be arranged in the holes of subset 136. These four (4) arrangements are shown in FIG. 12. Ownership by a first bank is represented by arrangement 138, a second bank by arrangement 140, a third bank by arrangement 142, and a fourth bank by arrangement 144. The computer controlling the operation of the ATM is programmed to recognize the electrical signals generated by switches 130 in response to these arrangements and is further programmed to use the information to settle accounts between the banks. If more than four (4) banks supply canisters, the additional banks can be handled by adding additional buttonholes 26 to subset 136 and appropriately programming the computer.

Figure 13:
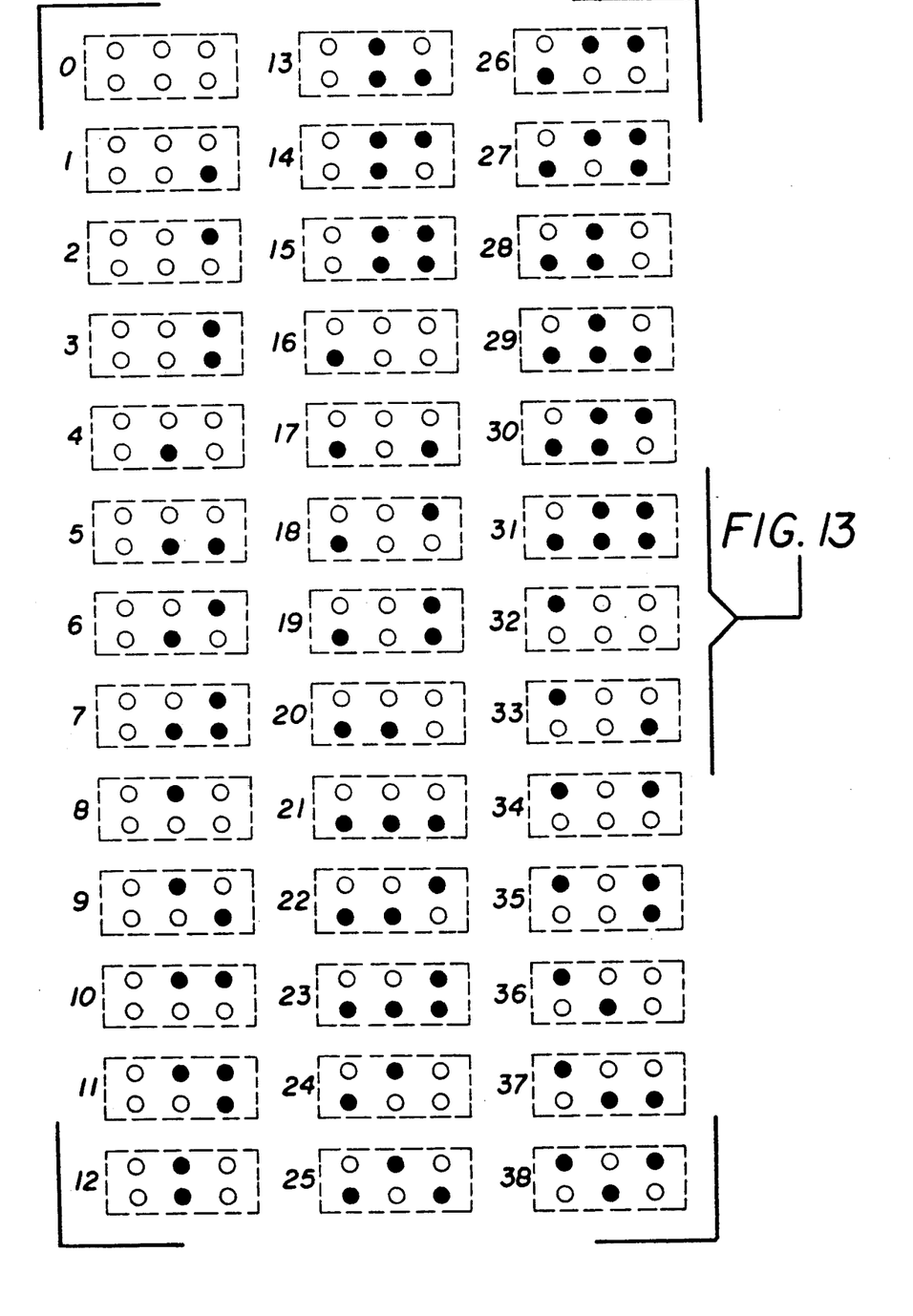

A second subset 146 is designated to represent canister serial numbers. Canisters are assigned decimal serial numbers which are represented by buttons forming binary numbers. This is accomplished by having each buttonhole in subset 146 represent a binary digit; absence of a button in a buttonhole representing a "0", and the presence of a buttonhole representing a "1". As subset 146 comprises six (6) buttonholes, the number of decimal serial numbers which can be represented are $(2)^6$ or 64. Arrangements of buttons in subset 146 for canisters having serial numbers zero through 38 are shown in FIG. 13. Serial numbers in excess of 64 are obtained by adding additional buttons to subset 146. Information on serial numbers of canisters involved in dispense failures can be stored in the memory of the computer and analyzed to determine canisters that may have defective conditions. Further, because ownership of each canister is indicated by the arrangement of buttons in subset 136, the computer can distinguish between canisters of different owners which have the same serial number.

A third subset 148 is designated to represent document character. This subset contains a pair of buttonholes each of which comprises a sub-subset The sub-subset 150 consisting of the upper buttonhole in subset 148 (see FIG. 15) indicates document type. According to the preferred embodiment of the present invention, the ATM dispenses two (2) types of documents; paper currency and coupons which are approximately the same physical size as paper currency. The absence of a button in sub-subset 150 indicates that the documents in the canister are currency. The presence of a button indicates coupons. The computer operating the ATM is programmed to recognize the data represented by this arrangement and to control the operation of the various picking mechanisms to dispense currency or coupons according to what is requested. In addition, as coupons may be optimally dispensed at a different rate than currency, the computer is programmed to adjust the rotational speed of roller member 102 and stripper rolls 116 of the picker mechanism 100 to a predetermined speed optimum for the dispense of coupons when the button is present.

Figure 14:
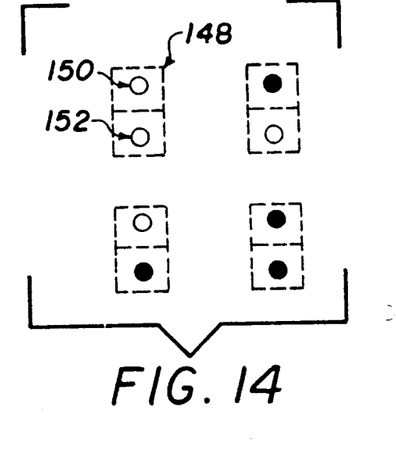

Sub-subset 152 is the other subset of subset 148. It includes a single buttonhole. Sub-subset 152 represents data on the new or used character of the documents in the canister. The presence of a button in the hole represents new documents whereas the absence of a button represents used. As new and used documents are optimally dispensed at different speeds, the computer is programmed to adjust the speed of picker mechanism 100 based on the new or used character of the given type of documents. Thus there are four (4) possible arrangements of buttons in subset 148 shown in FIG. 14. These clockwise from upper left, are: used currency, used coupons, new coupons, and new currency.

Figure 15:
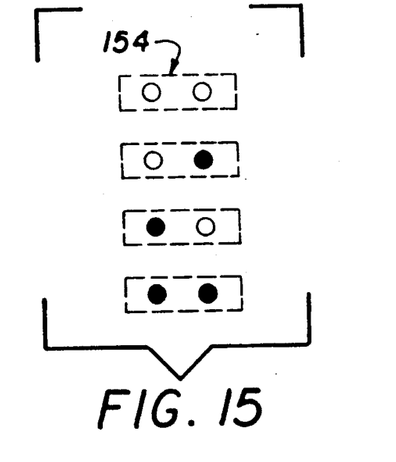

A fourth subset 154 of buttonholes 26 is designated to represent document denomination. As subset 154 contains a pair of holes, four (4) denominations may be represented as shown in FIG. 15. These arrangements of buttons in subset 154 are assigned to represent from top to bottom in FIG. 15, $1, $5, $10, and $20 denominations. The computer controlling the operation of the ATM is programmed to recognize these arrangements and to control the operation of the picking mechanisms according to the denomination of the documents in the canister loaded adjacent to each picking mechanism. Thus regardless of the positions of the various canisters in the ATM, the correct type and denomination of documents is dispensed.

A fifth subset 156 contains button 25' which is a means for indicating the status of documents inside the canister. As was previously explained, the condition of button 25' varies with the number of documents remaining in the canister. Button 25' causes the production of a signal each time a pre-established document level is reached. The computer is programmed to count the signals caused by button 25' and to provide an indication of the number of documents remaining in each canister as well as when each canister needs to be replenished.

A sixth subset 158 is used to verify that the data reported by the arrangements of buttons in subsets 136, 146, 148, and 154 have been received. This is accomplished by buttonholes representing decimal numbers through binary digits as previously explained. The number of buttonholes required in the verification subset is determined by the maximum number of buttons that could possibly be present in all the other subsets, excluding subset 156. If for example, there are potentially sixteen (16) buttons that could be located in all the other subsets, the data for verification subset 158 would require four (4) buttonholes. This is so because a number comprised of four (4) binary digits may have up to $(2)^4$ or sixteen (16) different combinations. The condition of subset 156 cannot be verified by the verification subset 158 as its condition varies with the document supply and is not pre-established as is the case with other subsets.

Figure 16:
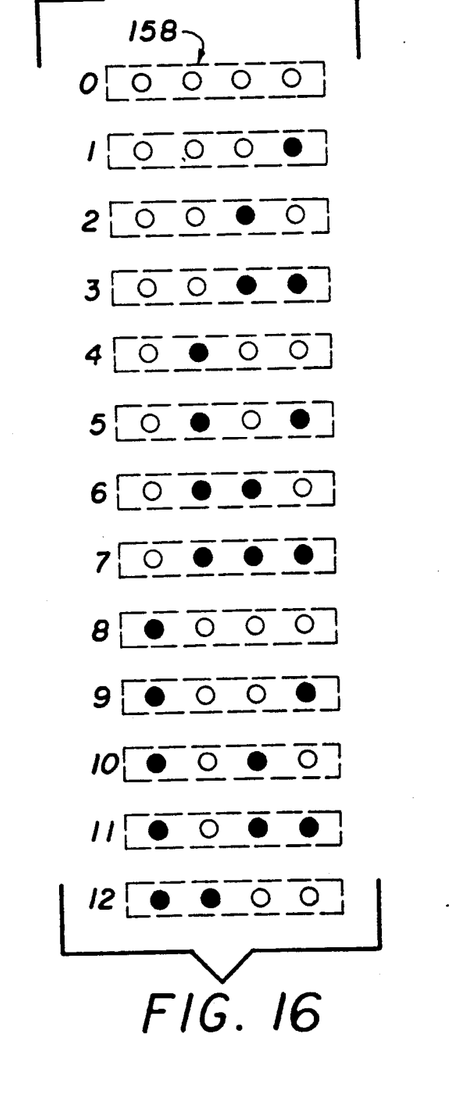

Upon insertion of canister 10 into operating position relative to picker 100, the computer receives signals from switches 103 representative of the arrangements of the buttons in subsets 136, 146, 148, 154, and the verification subset 158. The computer is programmed to calculate the number of signals received on account of the various buttons 25, exclusive of the buttons in the verification subset, and determines the total. Thereafter the computer reads the signals from the verification subset, transforms the signals into a binary number, and converts the number to a decimal number which is compared to the total of buttons found in the other subsets. If the values compared do not coincide, the computer is programmed to give a signal indicating a fault condition. The arrangement of buttons in subset 158 representing zero (0) through twelve (12) buttons, which are the total number of buttons which may be present in subsets 136, 146, 148, and 154 are shown in FIG. 16.

Other subsets of buttonholes 26 could be designated to represent other information based on the needs of the operator of the ATM. The number of buttons and thus the amount of information which can be presented on one canister is limited only by physical constraints such as the size of face plate 24, switch plate 126, buttons 25, and switches 130. One way of reducing the space occupied by actuators 128 and switches 130 is to use a single conductive array of tactile switches such as an FL-type array manufactured by S.P. America Inc., of San Jose, Calif., in lieu of individual switches.

Once information is placed on canister 10 through an appropriate arrangement of buttons 25, the computer will read the information and operate to dispense documents from the canister according to the information presented. The buttons on canister 10 are not subject to tampering as they are mounted from behind face plate 26 and must be removed from inside canister 10 which is normally secured by locking means 29. In addition, buttons 25 are made of durable plastic material and are not subject to breakage. The arrangement of buttons is not sensitive to vibration, shock or changes in temperature. If, however, it is desired to place a different denomination or type of document in a canister, a change in button arrangement may be easily accomplished so that the computer will operate using the canister in conformance with the new document. To change the button arrangement, the locking means of canister 10 is opened and spring assemblies 54 removed. Removal of these parts releases backing plate 50. Removal of backing plate 50 provides access to buttonholes 26 and the rear of buttons 25. Buttons 25 may then be relocated, removed, or new buttons installed. Backing plate 50 and spring assemblies 54 are reinstalled by reversing the disassembly process. Thus the rearrangement of buttons may be accomplished quickly and by persons without particular technical expertise.

The foregoing method and apparatus may be used to present information on document canisters in machine readable form which can be utilized for a variety of purposes in a document dispensing system. The invention is inexpensive to implement, reliable and is not subject to failure due to human error or mishandling of the equipment involved. The invention is resistant to tampering and yet information presented according to the invention may be easily modified by authorized personnel not having technical skill.

Thus, the new method and apparatus for identifying and indicating the contents of document canisters achieves the above-stated objectives, eliminates difficulties encountered in the use of prior apparatus and methods, solves problems, and obtains the desirable results described herein.

In the foregoing descriptions certain terms have been used for brevity, clarity, and understanding; however, no unnecessary limitations are to be implied therefrom because such terms are for descriptive purposes and are intended to be broadly construed. Moreover the description and illustrations given are by way of example and the invention is not limited to the exact details shown or described. Having described the features, discoveries, and principles of the invention, the manner in which it is utilized, and the advantages and useful results obtained, the new and useful methods, structures, devices, elements, arrangements, parts, combinations, systems, equipment, operations, and relationships are set forth in the appended claims.

We claim:

1. A system for keeping accounts between a plurality of institutions having affiliated customers who provide identifying information to and receive documents of value from a plurality of document dispensing machines; and a plurality of entities supplying documents to said machines;

wherein each of said machines includes at least one removable container for holding documents prior to dispense therefrom; and wherein said accounts are computed and stored in a computer means for computing amounts owed by said institutions to said entities responsive to signals representative of said customers and said dispensed documents generated by said machines, said computer means including a processor and a memory, said memory including data on said customers, institutions, entities, and accounts;

wherein an improvement in said system comprises:

a machine readable indicia on said containers, said indicia having a first arrangement associated with a first entity supplying documents in a first container;

means in said machines for reading said indicia when said first container is positioned therein and for generating first signals representative of said arrangement; and wherein said computer means receives said first signals, identifies said first entity and computers amounts owed to said first entity by said institutions for documents received by their affiliated customers.

2. The system according to claim 1 wherein said machine readable indicia comprise a plurality of protuberances extending from a wall of said first containers.

3. The system according to claim 2 wherein said wall includes a plurality of holes and said protuberances are spring loaded buttons extending through said holes.

4. A method for keeping accounts between a plurality of institutions having affiliated customers who provide identifying information to and receive documents from a plurality of document dispensing machines, each of said machines having at least one removable document container for holding documents prior to dispense; and a plurality of entities supplying documents in said containers; and wherein in said method accounts owed by said institutions to said entities are calculated in a computer which receives signals from said machines representative of said customer information and said documents dispensed to said customers, and said computer stores information on said affiliation of said customers to said institutions;

wherein an improvement in said method comprises:

labeling a first container installed in a first machine with machine readable indicia, said indicia having a first arrangement associated with a first entity providing documents therein;

reading said indicia with reading means in said machine, and generating first signals representative of said arrangement;

identifying said first entity from said first signals in said computer, and calculating an amount owed to said first entity by said institutions for documents received from said first machine by their affiliated customers.

5. The method according to claim 4 wherein said machine readable indicia comprises protuberances extending from a wall of said container, said protuberance located in a plurality of locations, and wherein said first arrangement is formed by locating said protuberances in selected locations.

* * * * *